United States Patent [19]
Edelmann et al.

[11] Patent Number: 6,132,092
[45] Date of Patent: *Oct. 17, 2000

[54] BALL BEARING FOR PERMITTING LINEAR MOVEMENT AND METHOD FOR MAKING SAME

[75] Inventors: Ludwig Edelmann, Sulzthal; Hermann Glöckner, Schweinfurt; Uwe Mayer, Münnerstadt; Henryk Velde, Werneck; Lothar Walter, Schweinfurt, all of Germany

[73] Assignee: SKF Linearsysteme GmbH, Schweinfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/019,780

[22] Filed: Feb. 6, 1998

[30] Foreign Application Priority Data

Feb. 7, 1997 [DE] Germany ............................ 197 04 632

[51] Int. Cl.[7] ....................................................... F16C 29/06
[52] U.S. Cl. .............................................................. 384/43
[58] Field of Search ................................. 384/43, 44, 45; 464/168

[56] References Cited

U.S. PATENT DOCUMENTS

| | | |
|---|---|---|
| 4,073,547 | 2/1978 | Lundgren et al. ........................ 384/43 |
| 4,303,280 | 12/1981 | Geffner ...................................... 384/43 |
| 4,469,380 | 9/1984 | Cowles ...................................... 384/43 |
| 5,145,260 | 9/1992 | Edelmann et al. . | |

FOREIGN PATENT DOCUMENTS

| | | |
|---|---|---|
| 35 06 803 | 8/1986 | Germany . |
| 40 15 124 | 11/1991 | Germany . |
| 98/21494 | 5/1998 | WIPO . |

*Primary Examiner*—Lenard A. Footland
*Attorney, Agent, or Firm*—Burns, Doane, Swecker & Mathis, L.L.P.

[57] ABSTRACT

A ball bearing for permitting linear movements includes a cage having an inner surface that is adapted to surround a shaft, a plurality of axial guide tracks for receiving load-bearing balls and axial return tracks for receiving non-load-bearing balls. A cover is provided at each end of the cage, with each cover being provided a turn-around track that connect an end of one guide track with an end of an adjoining return track. The guide tracks and the return tracks have a slit extending along the length of the tracks and opening radially inwardly. To enable economical production of the bearing with relatively simple tools and universal use of a single cage for different ball bearings, the lateral guide walls of both the guide tracks and the return tracks possess the same cross-sectional configuration and, in the radial outer area of the cage, are provided with axially extending grooves. The cage is manufactured with breaking points distributed around the outer circumference of the cage for permitting radially outer portions of the cage to be removed.

22 Claims, 2 Drawing Sheets

BALL BEARING FOR PERMITTING LINEAR MOVEMENT AND METHOD FOR MAKING SAME

This application claims priority under 35 U.S.C. § 119 of German Application No. P 197 04 632.0, filed on Feb. 2, 1997, the entire content of which is incorporated herein by reference.

FIELD OF THE INVENTION

The present invention generally relates to ball bearings. More particularly, the present invention pertains to a ball bearing that permits linear movement and a method for producing such a ball bearing.

BACKGROUND OF THE INVENTION

A ball bearing that is adapted to be mounted on a shaft to permit linear movements is disclosed in German Offenlungsschrift No. 40 15 124. This known type of ball bearing includes a cage provided with guide tracks and return tracks that receive balls, and ball track plates that are positioned in recesses circumferentially disposed about the cage. The ball track plates are provided with lateral beads that fit into the recesses in the cage. The guide walls of the guide tracks and the return tracks are adapted to the size of the balls, with both the guide tracks and the return tracks having a slit that opens radially inwardly towards the shaft. In the radially outward direction, the guide tracks are covered by the ball track plates and the return tracks are covered by the cage jacket.

In this known design, the cross-section of the cage in the area of the guide tracks differs from the cross-section of the cage in the area of the return tracks. That is, the cage in the area of the guide tracks has a different material thickness than in the area of the return tracks. When the cage is produced from plastic material by injection molding, distortion can occur during manufacturing. Also, it must be determined from the start where the guide tracks and return tracks are to be located or distributed along the circumference of the cage. This means that different cage designs must be produced for different arrangements in spite of identical cage dimensions. This requires a higher expenditure for injection tools, and increases manufacturing costs and stock-keeping costs.

A need thus exists for a way of producing a linear movement ball bearing (i.e., a ball bearing that is adapted to permit linear movements) in which the essential component of the ball bearing, i.e. the cage, can be economically produced with relatively simple tools.

A need also exists for a way of producing a linear movement ball bearing which offers the possibility of producing different alternatives of the ball bearing with a customized arrangement of the load-bearing ball rows along the circumference, while using the same basic cage.

SUMMARY OF THE INVENTION

According to the present invention, the cage is fabricated so that the lateral guide walls of both the guide tracks and the return tracks of the cage have the same cross-sectional configuration and are provided with grooves that extend axially in the radial outer area of the cage.

By virtue of the present invention, it is possible to produce a cage which, after the injection molding process, for example, inside an axially releasing tool, has the same cross-sections for all axially extending ball tracks and the intermediate braces. Initially, all ball tracks in the cage are closed off radially towards the outside. However, the cage is provided with a plurality of spaced apart regions of breaking points that allow removal of a radially outer portion of the cage at desired locations corresponding to, for example, the guide tracks. Depending on the desired arrangement of the guide tracks along the circumference of the cage, the outside walls in the radially outer portion of the cage are broken out at the breaking points in the area of the desired guide tracks to produce radial breakthroughs at locations corresponding to the desired guide tracks. It is then possible to position in these radial breakthroughs ball track elements having projections for holding the ball track elements in place. The radial breakthroughs can be provided in the longitudinal direction with edges extending in a straight line. But it is also possible to provide sections of different width in the longitudinal direction. The ball track elements can then also be constructed similarly so that the projections of the ball track elements extend only over a part of the length of the ball track elements or project into the grooves of the cage only in certain areas.

The present invention also permits manufacture of a ball bearing involving first producing a cage blank in which all axially extending guide tracks and return tracks distributed over the circumference of the cage are constructed with identical cross-sections and are closed radially towards the outside. Depending on the desired arrangement of the guide tracks in the cage, breakthroughs can then be produced in the cage by removing radially outer portions of the cage. The breakthroughs can be produced at least in part during the production of the cage blank. The parts of the ball bearing can then be assembled, with ball track elements being placed in the breakthroughs.

In accordance with one aspect of the invention, a ball bearing for permitting linear movement along a shaft includes a cage having a plurality of ball tracks, each of which is defined by an axial guide track, an axial return track and a pair of turn-around tracks connecting together ends of the guide track and the return track. A cover is attached at each end of the cage, with the pair of turn-around tracks for each ball track being provided in the covers. A plurality of balls are positioned in and guided inside the ball tracks. The guide track and the return track of each ball track has a radially inwardly opening slit extending along the guide track and the return track. The guide track and the return track of each ball guide has lateral guide walls extending partially around the balls. The cage is constructed so that the lateral guide walls of both the guide tracks and the return tracks have the same cross-sectional configuration and have axially extending grooves in a radially outer portion of the lateral guide walls.

According to another aspect of the invention, a ball bearing for permitting linear movement along a shaft includes a cage having a plurality of ball tracks, each of which is defined by an axial guide track and an axial return track. Each guide track and each return track has a radially inwardly opening slit extending along the length of the guide track and the return track. In addition, each guide track and each return track have lateral guide walls. The slit in each respective guide track can have a radially inner slit width less than the distance between the lateral guide walls of the respective guide track, and the slit in each respective return track can have a radially inner slit width less than the distance between the lateral guide walls of the respective return track. The cage is also provided with a plurality of breaking points distributed circumferentially about the outer surface of the cage for permitting removal of radially outer portions of the cage at locations corresponding to the guide tracks to produce radial breakthroughs in the cage that communicate with the guide tracks.

Another aspect of the present invention involves a method for manufacturing a ball bearing that includes fabricating a cage to include a plurality of ball tracks for receiving a plurality of balls, with each ball track including an axial guide track and an axial return track. The guide track and the return track of each ball track has a radially inwardly opening slit and lateral guide walls. The cage is fabricated so that all of the guide tracks and the return tracks are covered radially towards the outer surface. The method further involves removing radially outer portions of the cage that cover at least some of the axial guide tracks to produce radial breakthroughs in the cage that communicate with the guide tracks.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein:

FIG. 1 is a cross-sectional view of a ball bearing in accordance with the present invention provided with breakouts for the ball track plates, with the bottom half of the drawing figure illustrating the cage prior to breaking out the breakthroughs and the top half of the drawing figure illustrating the cage after breaking out the breakthroughs; and FIG. 2 is a longitudinal cross-sectional view of the ball bearing according to the present invention taken along the section line II—II in FIG. 1.

DETAILED DESCRIPTION OF THE INVENTION

Figure 1:
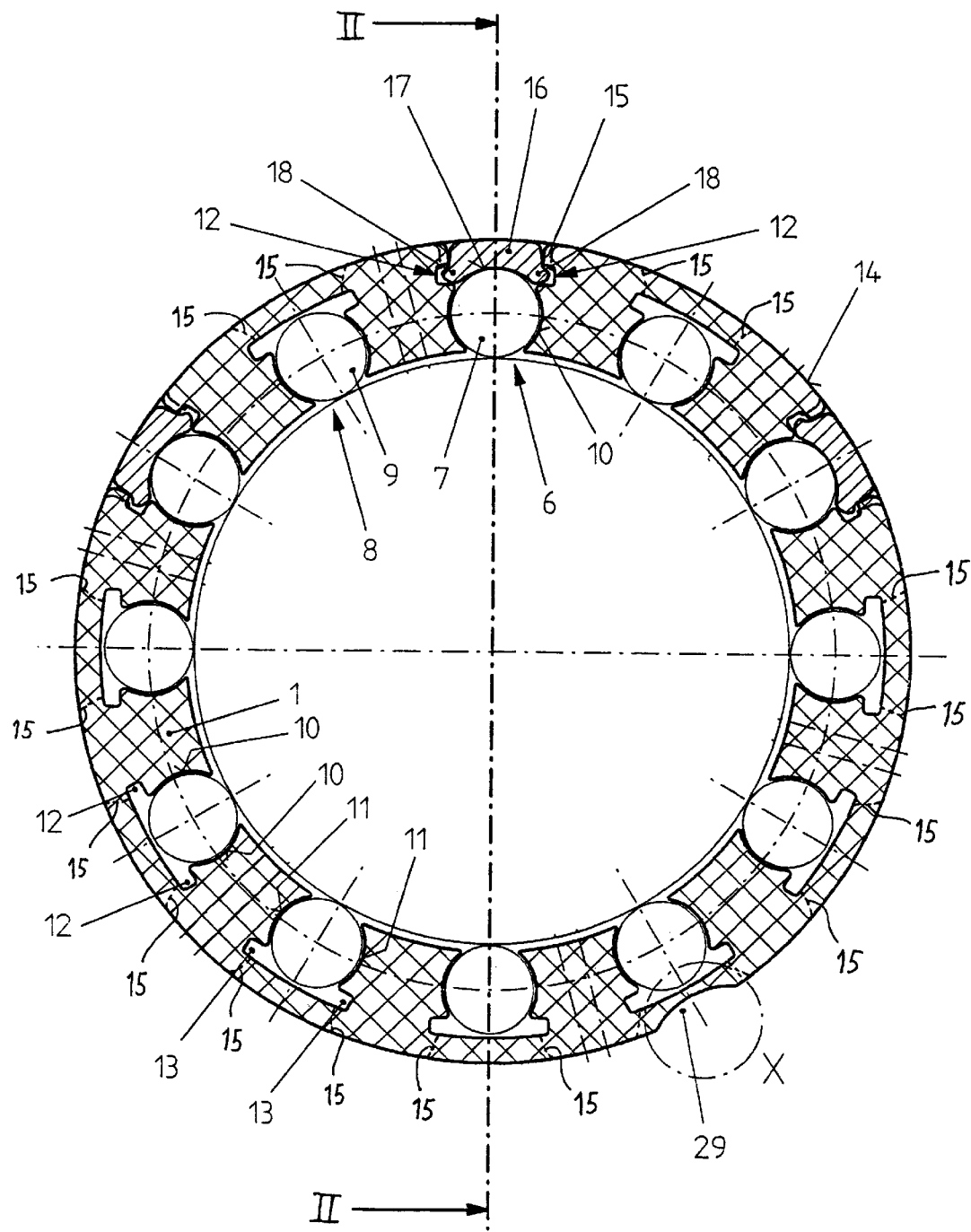
Figure 2:
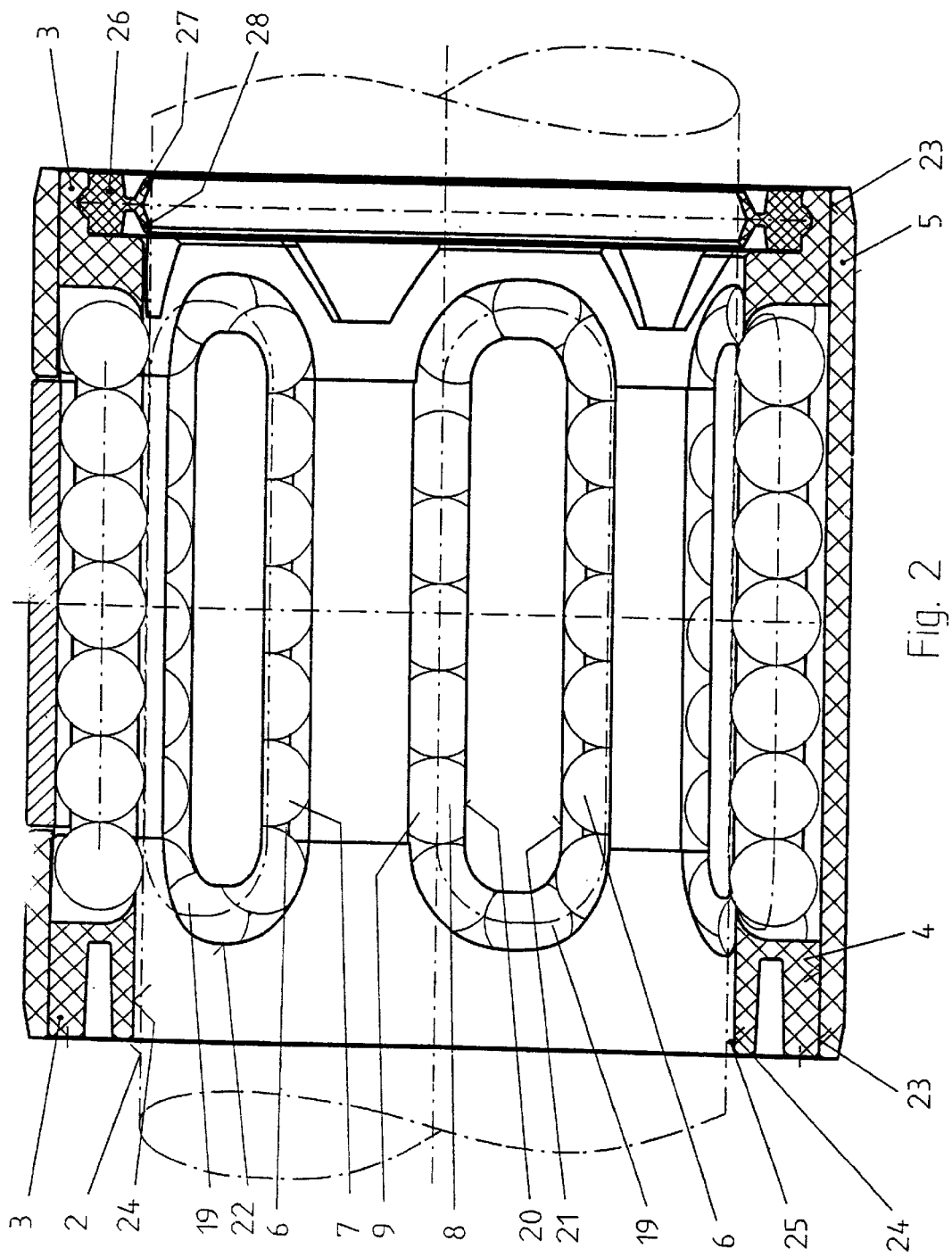

With reference to FIGS. 1 and 2, the ball bearing according to the present invention for permitting linear movements includes a cylindrically shaped cage 1 that is adapted to completely surround a cylindrical shaft 2. An annular cover 3 is attached to each end of the cage 1. The annular covers 3 are seated in a respective cylindrical bore surface 4 provided at each end section 5 of the cage 1 as seen in FIG. 2.

The cage 1 is provided with a plurality of endless ball tracks that are each defined by an axial guide track 6 for load-bearing balls 7, an axial return track 8 for non-load-bearing balls 9 and a pair of semicircular turn-around tracks 19. The semicircular turn-around tracks 19 are circumferentially distributed about the inside of the two covers 3. Each turn-around track 19 connects the end of a guide track 6 with the end of an adjoining return track 8. One guide track 6, one return track 8 and two axially opposing turn-around tracks 19 together form a ball track that is closed in itself and in which are located a plurality of the balls 7, 9.

The cage 1 and its two covers 3 are made of an elastomer that can be cast or injected, and are produced by injection molding in a mold. In a known manner, the injection mold for the cage can have axial sliders for molding the guide tracks 6 and the return tracks 8.

In the illustrated embodiment, the guide tracks 6 and the return tracks 8 are arranged alternately along the circumference of the cage 1. The guide tracks 6 are defined by lateral guide walls 10 while the return tracks 8 are defined by lateral guide walls 11. As seen in the bottom half of FIG. 1, the lateral guide walls 10, 11 of both the guide tracks 6 and the return tracks 8 possess the same cross-section having a circular arc shape surrounding the balls 7, 9 over the entire height. In addition, axially extending grooves 12 are provided in the radially outer region of the lateral guide walls 10. Each of these grooves 12 possesses a depth as measured in the lateral direction that is preferably greater than half the diameter of the balls 7 so that the grooves 12 project laterally beyond the balls 7. Similarly, the radially outer region of the lateral guide walls 11 are provided with axially extending grooves 13. These grooves 13 each possess a depth as measured in the lateral direction that is greater than half the diameter of the balls 9 so that the grooves 13 project laterally beyond the balls 9.

As noted, the lateral guide walls 10, 11, as well as the guide tracks 6 and the return tracks 8, can be configured to possess a somewhat circular arc shape. The lateral guide walls 10, 11 can be configured to surround the balls 7, 9 either over the entire height or only in the area within a partial circular arc and outside the partial circular diameter in a straight line. By virtue of this construction, the balls 7, 9 are able, within certain limits, to freely move outwardly in the radial direction.

As illustrated in the top half of FIG. 1, in the area of the guide tracks 6, the cage 1 is provided along its outer jacket or outer circumferential surface 14 with radial breakthroughs 15. These breakthroughs 15 are produced after the injection molding of the cage 1, with intended breaking points being provided along the edges of the breakthroughs 15 to facilitate the breaking out of the breakthroughs. The breakthroughs 15 are covered towards the radially outside by respective ball track elements or plates 16 made of, for example, steel.

Each of the ball track elements 16 is provided with a radially inwardly facing ball track 17 for receiving the load-bearing balls 7. Each ball track element 16 is provided with laterally protruding projections 18 which project into the lateral guide walls 10 of the guide tracks 6 and thus capture or hold the ball track elements 16 in place within the cage 1. By dimensioning the grooves 12, 13 in the manner described above so that they possess a depth as measured in the lateral direction that is greater than the diameter of the balls 7, 9, a relatively perfect radial retention of the ball track elements 16 can be achieved.

The radial breakthroughs 15 can be designed with edges extending in a straight line along their longitudinal extent. It is also possible, however, to configure the edges of the breakthroughs 15 so that the breakthroughs 15 possess sections of different width along their longitudinal extent. The ball track elements 16 would then be similarly designed so that the projections 18 extend only over a portion of the length of the ball track elements 16 or project into the grooves of the cage only in certain areas.

To produce the aforementioned breakthroughs 15 in the cage 1, at the time the cage is produced such as through injection molding, the cage 1 is provided with spaced apart regions of axially extending intended breaking points 15' which are illustrated in the lower half of FIG. 1. These axially or longitudinally extending intended breaking points 15' can be produced in a known manner to provide areas of material weakening in the cage 1 which will allow the radially outer portions of the cage 1 to be removed at a later time to thereby define the breakthroughs 15. Each region of breaking points 15' conforms in configuration to the outline of the breakthroughs 15. The regions of intended breaking points 15' are preferably positioned at locations along the circumference of the cage corresponding to the locations of all of the guide tracks 6 and return tracks 8. In this way, depending upon the desired arrangements of the guide tracks along the circumference, portions of the outside wall of the cage 1 can be broken out in the areas of the desired guide tracks 6 to form the breakthroughs 15 in which the ball track elements 16 are positioned. Circumferentially extending intended breaking points can also be provided in the area where the axial front faces of the ball track elements which will be inserted later.

In the area of the guide tracks 6, the cage 1 is provided with axially extending slits 20 that open radially inwardly towards the shaft 2. Similarly, axially extending slits 21 that open radially inwardly towards the shaft 2 are provided in the cage 1 in the area of the return tracks 8. The covers 3 also have a semicircular slit 22 in the area of the turn-around tracks 19. These slits 20, 21, 22 expose the balls 7, 9 and allow the balls 7, 9 to contact the shaft 2. The slits 20, 21, 22 have a radially inner slit width that is less than the diameter of the balls 7,9. The slit width is preferably also less than the distance between the lateral guide walls 10, 11.

When the shaft 2 is moved back and forth axially, the balls 7 roll between the ball track 17 of the respective ball track element 16 and the cylindrical outer surface of the shaft 2. The balls 7 thus transfer a radial load from the shaft 2 via the ball track element 16 to the bore of the housing into which the ball bearing is set. The load-bearing balls 7 move from the load-bearing zone (i.e. from the guide tracks 6) via the turn-arounds tracks 19 and into the return tracks 8 (i.e. into the non-load-bearing zone), and from there move as non-load-bearing balls 9 via the turn-around tracks 19 back into the guide track 6.

FIG. 2 shows two exemplary embodiments of the covers 3. Each of the covers 3 possesses an outer surface 23 that is positioned within and faces the bore surface 4 of the end section 5 of the cage 1. The bore 24 in the cover 3 that receives the shaft 2 possesses a diameter that is slightly larger than the outer diameter of the shaft 2, thus forming an annular gap 25 with the outer surface of the shaft 2. As illustrated in the right side of FIG. 2, an annular recess is formed in the axially outwardly facing end of the cover 3 and a seal 26 is positioned within this recess. The seal 26 includes two spaced apart sealing lips 27, 28 that rest with a pre-load on the outer surface of the shaft 2. A ball bearing can be provided of each end of the cage 1 with a cover similar to that shown on the left side of FIG. 2, or can be provided of each end of the cage 1 with a cover similar to that illustrated on the right side of FIG. 2, or can be provided with one of each cover as shown in FIG. 2.

In the lower half of FIG. 1, a further aspect of the ball bearing according to the present invention is shown at point "X". As illustrated, the cage 1 can be provided on its outer surface in the area of a return track 8 with an axially extending groove 29 having an arcuate segment-shaped cross-sectional contour that is integrated radially from the outside. A sensor or the like may project into this groove 29 in order to automatically align the cage 1 in a position in which the balls 7, 9 can be introduced into the ball bearing.

It is to be understood that these grooves 29 can be distributed along the entire circumference of the cage 1 in alignment with each of the guide tracks 6 and the return tracks 8. These grooves 29 weaken the radially outer portion of the cage 1 to thereby facilitate the breaking out of the portions of the cage to form the breakthroughs 15 in the area of the guide tracks 6. The grooves 29 remaining in the cage in the areas of the return tracks 8 after the breakthroughs 15 are produced function as contact surfaces for a sensor as mentioned above to permit automatic search for and alignment with or of the breakthroughs 15. This alignment can be used to effect the introduction of the balls 7, 9 into the individual ball tracks by way of the breakthroughs 15 prior to setting the ball track elements 16 in place.

As has already been mentioned, the present invention makes it possible to use the same basic cage for different design versions of the ball bearing, i.e. for a different distribution of guide tracks with load-bearing balls along the circumference. The covers 3, attached at the end of the cage and having turn-around tracks, each of which connects a guide track with a return track, can also be constructed identically for all possible versions. This also means that only one cover design is necessary for both sides of the bearing. Further, the seals can be easily snapped into these covers 3.

Thus, it is seen that the present invention provides a linear movement ball bearing and a method of producing such a ball bearing in which essential components of the ball bearing, e.g., the cage, can be economically produced with relatively simple tools. Further, the present invention provides a linear movement ball bearing and a way of producing such a bearing which offers the possibility of producing different alternatives of the ball bearing with a customized arrangement of the load-bearing ball rows along the circumference, while using the same basic cage.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Ball bearing for permitting linear movement along a shaft, comprising:

a one-piece cage adapted to be placed inside a bore of a housing, the cage having an inside surface for at least partially surrounding a shaft and a plurality of ball tracks, each ball track including an axial guide track, an axial return track and a pair of turn-around tracks connecting together ends of the guide track and the return track;

a cover attached at each end of the cage, said pair of turn-around tracks for each ball track being provided in said covers;

a plurality of balls guided inside said ball tracks, said balls having a diameter and an outer periphery;

the guide track and the return track of each ball track having a radially inwardly opening slit extending along the guide track and the return track, the slit having a radially inner slit width less than the diameter of the balls, the guide track and the return track of each ball guide having lateral guide walls formed integrally with and as a part of said one-piece cage and extending partially around the balls, at least some of the lateral guide walls of both the guide tracks and the return tracks having an axially extending groove in a radially outer portion of each of the lateral guide walls, each of said grooves extending laterally outwardly in opposite directions beyond the outer periphery of the balls in the respective ball track.

2. Ball bearing according to claim 1, wherein the cage includes an outer surface provided with radial breakthroughs that open into the guide tracks, and including a ball track element positioned in each breakthrough, each ball track element including laterally protruding projections that extend into the grooves in the lateral guide walls of the cage.

3. Ball bearing according to claim 2, wherein the radial breakthroughs have sections with different widths in the longitudinal direction.

4. Ball bearing according to claim 1, wherein the guide track and the return track of each ball guide having centers located along a cylinder that is concentric to a central axis of the cage.

5. Ball bearing according to claim 1, wherein the lateral guide walls of both the guide tracks and the return tracks possess a substantially arcuate segment-shaped cross-sectional contour that partially surrounds the balls.

6. Ball bearing according to claim 1, wherein the axially extending grooves in the lateral guide walls are deeper than one-half the diameter of the balls.

7. Ball bearing according to claim 1, wherein the cage has an outer surface that is provided with at least one axially extending groove, said groove being positioned at a place along the outer surface of the cage corresponding to a location of one of the return tracks.

8. Ball bearing according to claim 7, wherein said groove in the outer surface of the cage has an arcuate segment-shaped cross-sectional contour.

9. Ball bearing for permitting linear movement along a shaft, comprising:
a cage adapted to be placed inside a bore of a housing, the cage having an outer surface, the cage including a plurality of axial guide tracks and a plurality of axial return tracks;
each guide track and each return track having a radially inwardly opening slit extending along a length of the guide track and the return track, each guide track and each return track having lateral guide walls, the slit in each respective guide track having a radially inner slit width less than a distance between the lateral side walls of the respective guide track, the slit in each respective return track having a radially inner slit width less than a distance between the lateral side walls of the respective return track; and
plurality of weakened breaking points distributed circumferentially about the outer surface of the cage for permitting removal of radially outer portions of the cage at locations corresponding to the guide tracks to produce radial breakthroughs in the cage that communicate with the guide tracks.

10. Ball bearing according to claim 9, wherein the lateral guide walls of both the guide tracks and the return tracks having the same cross-sectional configuration.

11. Ball bearing according to claim 9, wherein the lateral guide walls of both the guide tracks and the return tracks have axially extending grooves in a radially outer portion of the lateral guide walls.

12. Ball bearing according to claim 11, wherein the axially extending grooves in the lateral guide walls extend laterally beyond the lateral guide walls.

13. Ball bearing according to claim 9, wherein the guide track and the return track of each ball guide having centers located along a cylinder that is concentric to a central axis of the cage.

14. Ball bearing according to claim 9, wherein the lateral guide walls of both the guide tracks and the return tracks possess a substantially arcuate segment-shaped cross-sectional contour.

15. Ball bearing according to claim 9, wherein the cage has an outer surface that is provided with at least one axially extending groove, said groove being positioned at a place along the outer surface of the cage corresponding to a location of one of the ball tracks.

16. Ball bearing for permitting linear movement along a shaft, comprising:
a cage adapted to be placed inside a bore of a housing, the cage having an inside surface for at least partially surrounding a shaft and a plurality of ball tracks, each ball track including an axial guide track, an axial return track and a pair of turn-around tracks connecting together ends of the guide track and the return track;
a cover attached at each end of the cage, said pair of turn-around tracks for each ball track being provided in said covers;
a plurality of balls guided inside said ball tracks, said balls having a diameter;
the guide track and the return track of each ball track having a radially inwardly opening slit extending along the guide track and the return track, the slit having a radially inner slit width less than the diameter of the balls, the guide track and the return track of each ball guide having lateral guide walls extending partially around the balls, the lateral guide walls of both the guide tracks and the return tracks having the same cross-sectional configuration and having an axially extending groove in a radially outer portion of each of the lateral guide walls, the cage including an outer surface provided with radial breakthroughs that open into the guide tracks, and including a ball track element positioned in each breakthrough, each ball track element including laterally protruding projections that extend into the grooves in the lateral guide walls of the cage.

17. Ball bearing for permitting linear movement along a shaft, comprising:
a one-piece cage adapted to be placed inside a bore of a housing, the cage having an inside surface for at least partially surrounding a shaft and a plurality of ball tracks, each ball track including an axial guide track, an axial return track and a pair of turn-around tracks connecting together ends of the guide track and the return track;
a cover attached at each end of the cage, said pair of turn-around tracks for each ball track being provided in said covers;
a plurality of balls guided inside said ball tracks, said balls having a diameter;
the guide track and the return track of each ball track having a radially inwardly opening slit extending along the guide track and the return track, the slit having a radially inner slit width less than the diameter of the balls, the guide track and the return track of each ball guide having lateral guide walls extending partially around the balls, at least some of the lateral guide walls having an axially extending groove in a radially outer portion of the lateral guide walls, a plurality of said grooves being covered by individually removable weakened portions of said one-piece cage that are integrally formed with said one-piece cage so that the individually removable portions of the cage can be individually removed to expose the respective groove.

18. Ball bearing according to claim 17, wherein the cage includes a plurality of breaking pints defining the individually removable portions of the cage.

19. Ball bearing for permitting linear movement along a shaft, comprising:
- a one-piece cage adapted to be placed inside a bore of a housing, the cage having an inside surface for at least partially surrounding a shaft and a plurality of ball tracks, each ball track including an axial guide track, an axial return track and a pair of turn-around tracks connecting together ends of the guide track and the return track;
- a cover attached at each end of the cage, said pair of turn-around tracks for each ball track being provided in said covers;
- a plurality of balls guided inside said ball tracks, said balls having a diameter;
- the guide track and the return track of each ball track having a radially inwardly opening slit extending along the guide track and the return track, the slit having a radially inner slit width less than the diameter of the balls, the guide track and the return track of each ball guide having lateral guide walls formed integrally with and as a part of said one-piece cage and extending partially around the balls, at least some of the lateral guide walls of both the guide tracks and the return tracks having an axially extending groove in a radially outer portion of each of the lateral guide walls, and a plurality of ball track elements, each ball track element having at least one protruding element received in one of said grooves.

20. Ball bearing according to claim 19, wherein each ball track element includes a pair of laterally protruding elements each received in a respective one of said grooves.

21. Ball bearing for permitting linear movement along a shaft, comprising:
- a cage adapted to be placed inside a bore of a housing, the cage having an inside surface for at least partially surrounding a shaft and a plurality of ball tracks, each ball track including an axial guide track, an axial return track and a pair of turn-around tracks connecting together ends of the guide track and the return track;
- a cover attached at each end of the cage, said pair of turn-around tracks for each ball track being provided in said covers;
- a plurality of balls guided inside said ball tracks, said balls having a diameter and an outer periphery;
- the guide track and the return track of each ball track having a radially inwardly opening slit extending along the guide track and the return track, the slit having a radially inner slit width less than the diameter of the balls, the guide track and the return track of each ball guide having a pair of lateral guide walls extending partially around the balls, the pair of lateral guide walls of the guide tracks and the pair of lateral guide walls of the return tracks being formed integrally and in one-piece with the cage, the lateral guide walls of both the guide tracks and the return tracks having the same cross-sectional configuration and having an axially extending groove in a radially outer portion of each of the lateral guide walls.

22. Ball bearing according to claim 21, wherein each of said grooves extends laterally outwardly in opposite directions beyond the outer periphery of the balls in the respective ball track.

* * * * *